United States Patent [19]

Crown et al.

[11] 3,966,097

[45] June 29, 1976

[54] FLUID METERING VALVE

[75] Inventors: Marlyn Dale Crown; Carl Eugene Finley, both of Sycamore, Ill.

[73] Assignee: Olin Corporation, New Haven, Conn.

[22] Filed: July 2, 1975

[21] Appl. No.: 592,707

[52] U.S. Cl. ........................................ 222/402.2
[51] Int. Cl.² ...................................... G01F 11/38
[58] Field of Search ...................... 222/402.2, 3; 137/627.5, 596.2

[56] References Cited
UNITED STATES PATENTS

| | | | |
|---|---|---|---|
| 2,380,745 | 7/1945 | Frantz | 137/627.5 X |
| 3,877,618 | 4/1975 | Gore | 222/402.2 |

*Primary Examiner*—Stanley H. Tollberg
*Attorney, Agent, or Firm*—Donald R. Motsko; William W. Jones

[57] ABSTRACT

A valve assembly for providing a measured amount of fluid under pressure from a bulk supply thereof. The bulk supply has a valved outlet which may be opened by a probe. The probe is slidably disposed in a valve housing which also contains a fluid measuring chamber. A valved outlet passage leads from the measuring chamber to an outlet adapted to receive a fluid line. The outlet passage and outlet are offset from the probe so that dispensed fluid does not pass through the probe or probe passage. The outlet passage valve is normally open but is closed when the probe is moved to open the bulk supply outlet valve. A rocking lever connects the probe and outlet passage valve to open and close the latter.

9 Claims, 4 Drawing Figures

FLUID METERING VALVE

This invention relates to a valve assembly for providing and dispensing a measured charge of fluid under pressure from a supply thereof.

Valve assemblies for providing a measured amount of charge of fluid under pressure from a bulk supply thereof are known in the prior art. Such valve assemblies have found wide spread usage in various areas, one of which relates to cold weather starting of diesel engines.

Prior art diesel engine starting assemblies include a bulk supply of a starting fluid, such as diethyl ether and a dissolved propellant gas which is kept in a storage tank under pressure. The storage tank outlet is sealed with a conventional tire valve having surfaces of a suitable material which resists ether corrosion. A measuring and dispensing valve assembly is connected to the storage tank and is actuated, when needed, to withdraw a measured amount of the starting fluid from the bulk supply, and then transfer the measured amount of starting fluid to the engine manifold where it is drawn into the engine to serve as a starting fuel. These measuring and dispensing valve assemblies include a measuring chamber, a valve for opening and closing an outlet from the measuring chamber, and a probe for opening and closing the storage tank outlet valve. U.S. Pat. No. 3,189,014 to M. L. Kus, granted June 15, 1965; and U.S. Pat. No. 3,198,404 to J. H. Welches, granted Aug. 3, 1965 are directed to such arrangements.

When dispensing highly combustible fluids, such as diethyl ether for injection into a diesel engine, it is important that the amount of combustible fluid delivered to the engine be relatively consistent from shot to shot. U.S. Pat. No. 3,877,618 granted Apr. 15, 1975 to William C. Gore deals with this latter problem and offers a solution thereto which ensures that the outlet passage valve in the metering assembly will be closed before the bulk supply outlet valve is opened.

The solution afforded by the Gore U.S. Pat. No. 3,877,618 patent has several drawbacks relating to its use of a sealing slide actuator which carries the measuring chamber outlet valve with it as an internal part thereof. This construction requires a heavy large diameter slide which can only be actuated by a relatively high operating force. Thus when the Gore device is to be operated electrically, a high power electrical actuator must be used. Thus the overall expense of the Gore device is increased by the use of two measuring chamber valves, or heavy large diameter slide actuator, and a high energy electrical energizer. The overall weight of the Gore device is also heavier than would be preferred.

The apparatus of this invention affords the same operating advantages of the Gore device while adding thereto the further advantages of reduced size, weight and complexity, plus being usable with a less expensive lower power electrical actuator. In order to permit the use of a small diameter light weight actuating probe to open and close the bulk supply, the metering device has only one internal valve which is disposed in the assembly outlet passage. The latter is offset laterally from the actuating probe so that dispensed fluid does not pass through nor around any part of the probe. A rocking lever is connected to the probe and the outlet valve and is operable to hold the outlet valve open when the probe is in a non-actuating position with respect to the bulk supply outlet valve. The rocking lever is further operable to close the outlet valve when the probe is moved toward the bulk supply outlet valve to open the latter. Return of the probe to its non-actuating position results, by means of the lever, in return of the outlet valve to its open position to release the fluid from the measuring chamber.

It is, therefore, an object of this invention to provide a fluid measuring and dispensing assembly for use in conjunction with a bulk supply of fluid under pressure from which measured amounts of the fluid are periodically dispensed.

It is a further object of this invention to provide an assembly of the character described wherein the fluid to be dispensed does not pass through or around the actuating probe used to operate the apparatus.

It is yet another object of this invention to provide an assembly of the character described which includes a light weight small diameter actuating probe which can be actuated with a low power electrical actuator, such as a solenoid.

These and other objects and advantages of the invention will become more readily apparent from the following detailed description of one embodiment of the invention taken in conjunction with the accompanying drawings, in which.

Figure 1:
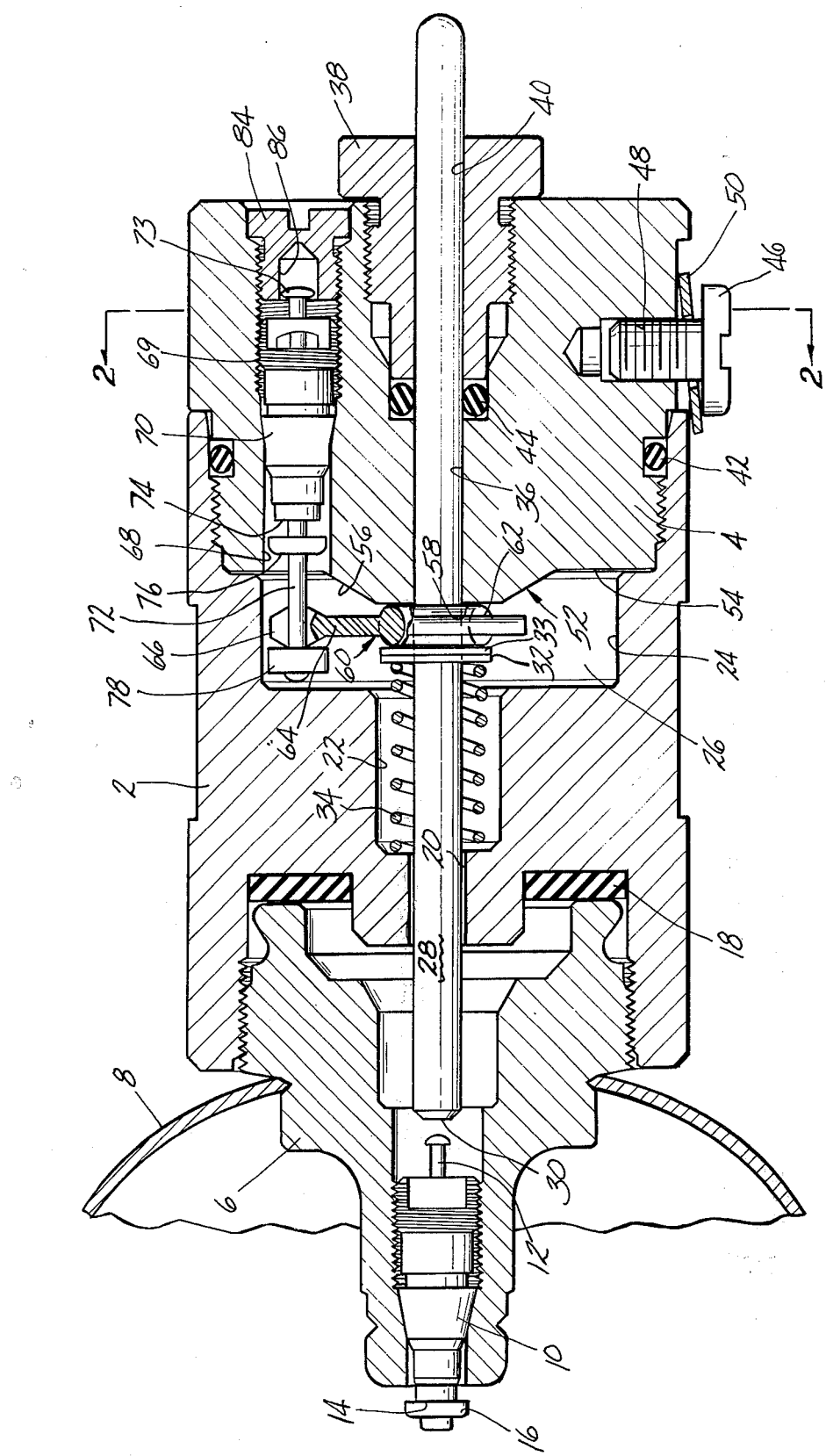
FIG. 1 is an axial sectional view of one embodiment of the fluid metering valve assembly of this invention shown in a first position wherein the bulk supply of fluid is closed from the measuring chamber.

Referring now to FIG. 1, there is shown an embodiment of the metering valve assembly of this invention. The assembly includes a body 2 and closure cap 4 which combine to form a valve housing. The body 2 is threaded onto the outlet plug assembly 6 of a bulk supply tank 8 of the fluid to be metered, which fluid is maintained in the tank 8 under pressure. The bulk supply outlet plug 6 contains a conventional core valve assembly 10 which controls passage of the fluid from the tank 8, the valve 10 being shown in FIG. 1 in its closed condition. The valve 10 is a conventional core valve having a stem 12, valve seat 14 and movable valve head 16, with the sealing surfaces being modified to resist corrosion from the fluid being dispensed. It will be noted that an annular seal 18 seals the interface between the valve body 2 and bulk supply outlet plug 6.

The valve assembly body 2 includes an axial bore 20 which is enlarged at 22 and further enlarged at 24 to form an internal fluid measuring chamber 26 the volume of which, along with the volume of the bulk supply outlet plug, determines the size of the charge of fluid which will be dispensed by the device. A sliding probe 28 is movably mounted in the axial bore 20 and includes a nose 30 normally spaced apart from the bulk supply outlet valve stem 12. The axial bore 20 and probe 28 are sized so that fluid may pass from the bulk supply container 8 into the measuring chamber 26 when the outlet valve 10 is opened, as will be explained in more detail hereinafter. It will be understood that the probe 28 is shown in FIG. 1 in its non-actuating position, that is to say, in a position wherein no fluid may escape from the container 8 by way of the valve 10. A retaining ring 32 is fixedly secured to the probe 28 adjacent to a freely sliding washer 33 and engages a return spring 34 which biases the probe 28 away from the valve stem 12, or toward its non-actuating position.

The closure cap 4 also includes an axial bore 36 through which the probe 28 extends. A retaining nut 38 is threaded into the closure cap 4 and includes an axial bore 40 from which the probe 28 projects. It will be understood that an appropriate modification of the retaining nut 38 can be used to secure an electrical actuator such as a solenoid (not shown) or a mechanical lever-type actuator to the cap 4 in such a way that the solenoid core can act upon the probe 28 to push the latter to the left against the bias of the spring 34 and into engagement with the valve stem 12 so that the device can be made electrically actuable or mechanically actuable. It will also be readily understood that a manually operable mechanical push rod could also be used to operate the probe 28, if so desired. O-ring seals 42 and 44 are provided to seal the measuring chamber 26 against fluid leakage.

A lock screw 46 is threaded into an opening 48 in the cap 4 and engages a serrated washer 50 which overlaps the cap 4 and body 2 to lock the two pieces together thus preventing loosening of the connection between the two parts which would otherwise occur from vibration of the diesel engine with which the metering valve assembly operates.

Figure 3:
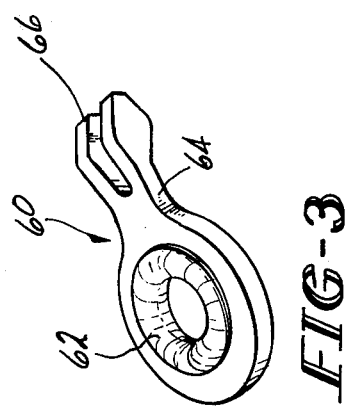
FIG. 3 is a perspective view of the rocker lever used to connect the probe and outlet valve to selectively open and close the latter.

The inner surface 52 of the cap 4 is frustoconical in shape and includes a peripheral planar portion 54, an intermediate tapered portion 56, and a central planar portion 58. A rocking link or lever 60, shown best in FIG. 3, is mounted within the measuring chamber 26 and operates as follows. The lever 60 includes a first annular portion 62 which encircles the probe 28 and which is normally held against the planar portion 58 of the inner cap surface 52 by the retaining ring 32 and washer 33 and the spring 34. The lever 60 further includes an elongated intermediate portion 64 which extends laterally from the first annular portion 62 and terminates in a bifurcated portion 66.

The cap 4 is provided with an outlet passage 68 into which is threaded a core valve 70. The core valve 70 includes a stem 72, a valve seat 74 and a valve head 76 mounted on the stem 72. It will be noted that the stem 72 extends beyond the valve head 76 to provide a portion thereof which passes through the bifurcated portion 66 of the lever 60. A retaining collar 78 is secured to the valve stem terminal and acts to connect the valve stem 72 to the lever 60. It will be noted that the core valve 70 includes an internal spring (not shown) which tends to bias the valve head 76 toward the valve seat 76 in a conventional manner to close the valve, but the closing impetus of this internal spring is resisted by the probe return spring 34 so long as the probe 28 is not displaced from its non-actuating position, as shown in FIG. 1. Thus it is readily apparent that the lever 60 holds the valve 70 open when the probe 28 is not pushed to the left to open the bulk supply outlet valve 10 (as viewed in FIG. 1). Therefore the measuring chamber 26 has an outlet passage 68 which is normally open to fluid flow by means of a reverse-actuated core valve 70.

Figure 2:
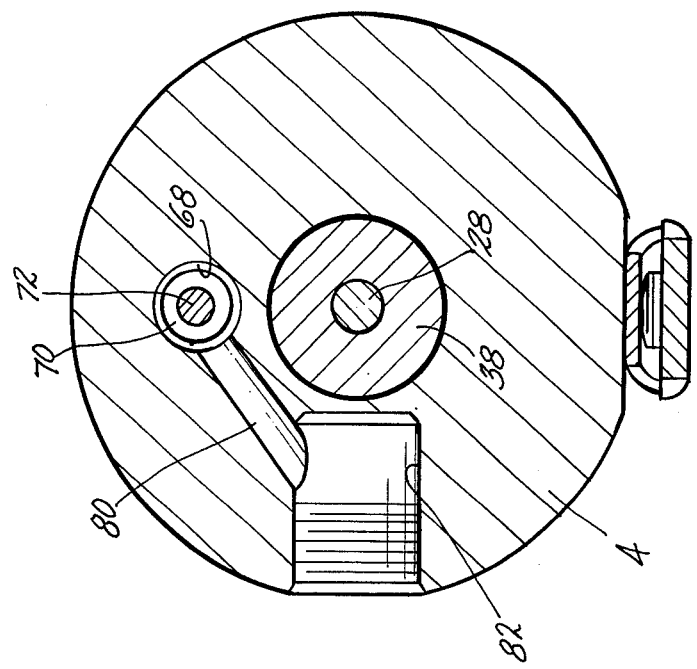
FIG. 2 is a radial sectional view taken along line 2—2 of FIG. 1 showing the measuring chamber outlet passages.

As seen in FIG. 2, the outlet passage 68 communicates downstream of the valve 70 with a lateral outlet conduit 80 drilled in the cap 4. The outlet conduit 80 in turn communicates with an outlet port 82 which is threaded internally so as to readily receive a conventional fitting attached to a fluid line (not shown) which extends to the manifold of the diesel engine with which the device of this invention is to be used. Thus the outlet passage 68, outlet conduit 80 and outlet port 82 combine to form an outlet flow path for fluid from the measuring chamber 26, which flow path does not pass through the probe 28 through the probe passage 36. The outlet valve 70 which controls fluid flow through the outlet flow path is not mounted in the probe 28, but is laterally offset therefrom and connected thereto by the lever 60. For these reasons, the probe 28 can be made from small diameter stock and can be a light weight member which can be actuated by a low energy electrical actuator. The device of this invention is thus of lower cost and greater simplicity than the prior art devices. It will be noted that the outlet passage 68 is threaded at 69 to receive the core valve 70 and also to receive a threaded closure plug 84 which provides a metal-to-metal seal behind the core valve 70 to prevent leakage of the fluid as it passes through the outlet flow path. The plug 84 is hollowed out at 86 to allow for opening and closing reciprocating movement of the valve stem head 73.

Figure 4:
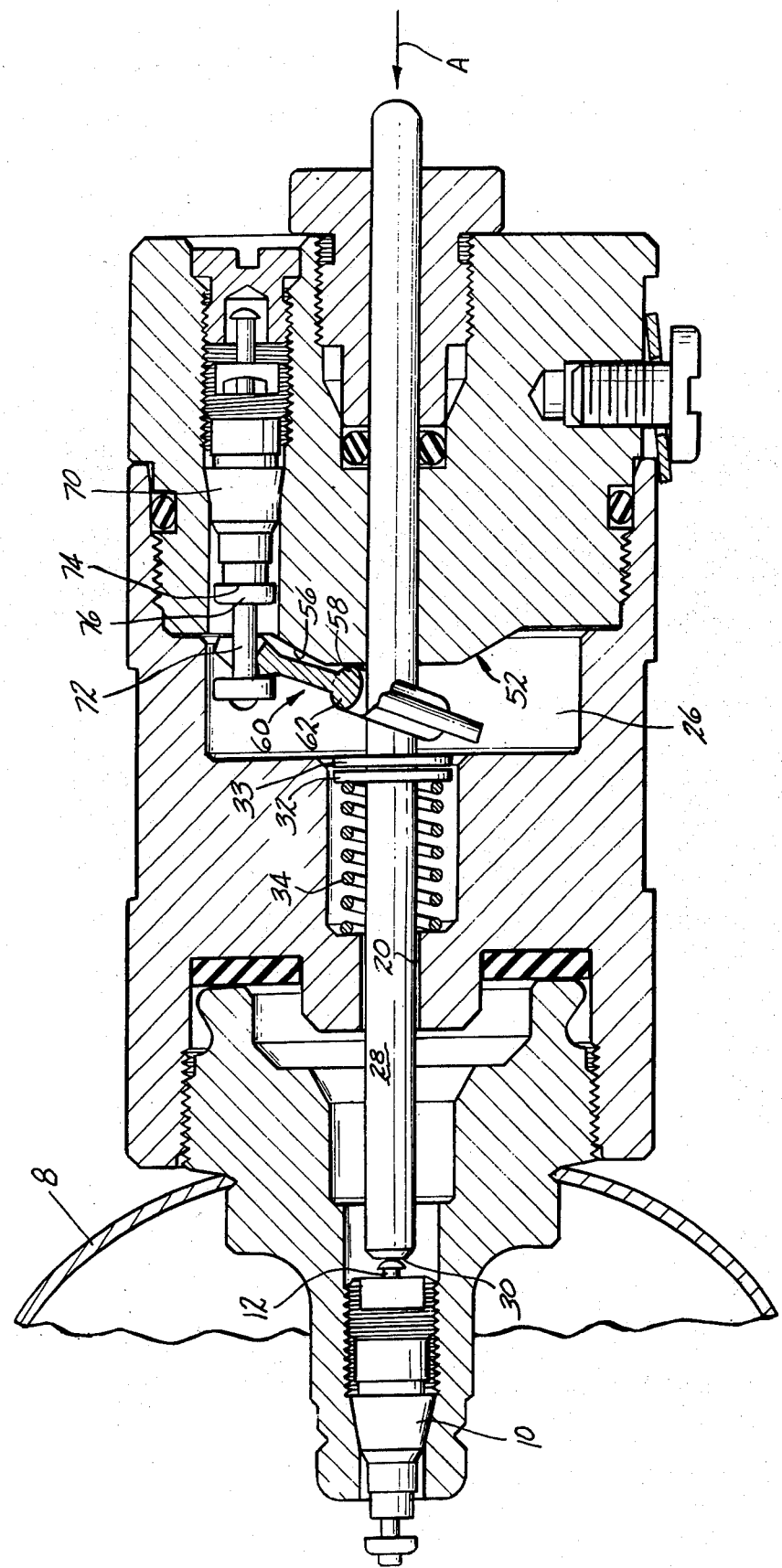
FIG. 4 is an axial sectional view of the device of FIG. 1 but showing the probe in a position wherein the bulk supply outlet valve is open and the measuring chamber outlet valve is closed.

As has been previously noted, the metering valve assembly is shown in FIG. 1 in a condition wherein the bulk supply outlet valve 10 is closed and the measuring chamber outlet valve 70 is open. In this condition there is no fluid in the measuring chamber 26. FIG. 4 illustrates the condition of the assembly wherein the measuring chamber 26 will be filled with fluid from the bulk supply tank 8. In order to effect filling of the measuring chamber 26 with fluid, the probe 28 is pushed in the direction of the arrow A causing the retaining ring 32 and washer 33 to be moved away from the probe-encircling annular part 62 of the lever 60 and compressing the spring 34. As the ring 32 moves away from the lever 60, the core valve 70 is freed to use its internal spring (not shown) which is connected to the valve stem 72 to pull the valve head 76 toward the valve seat 74 until the valve 70 is closed. Closure of the valve 70 causes the lever 60 to rock or pivot about its probe-encircling annular part 62 and the central planar portion 58 of the inner cap surface 52. The intermediate tapered surface 56, it will be appreciated, permits this rocking motion of the lever 60 to occur.

The probe 28 is sized lengthwise so as to ensure that the probe nose 30 will not contact the bulk supply outlet valve stem 12 until after the measuring chamber outlet valve 70 has closed. After the valve 70 has closed, actuating movement of the probe 28 continues in the direction of the arrow A with the probe 28 merely sliding through the first annular portion 62 of the lever 60 to about the position shown in FIG. 4 at which the probe 28 is deemed to be in its actuating position, and at which the probe nose 30 has depressed the bulk supply outlet valve stem 12 and opened the valve 10 for fluid flow from the bulk supply tank 8. Fluid from the bulk supply flows through the bore 20 (around the probe 28) and into the measuring chamber 26 to fill the latter. This filling flow of fluid occurs substantially instantaneously since the fluid supply is under pressure. The probe 28 is then released from its actuating force and the spring 34 returns the probe 28 to the position shown in FIG. 1, its non-actuating or normal position. As the probe returns to its normal position, the bulk supply outlet valve 10 is closed first and then the lever 60 is pivoted back to the position shown in FIG. 1 causing the measuring chamber outlet valve 70 to open. When the valve 70 opens, the measured charge of fluid is driven from the chamber 26 by the propellant gas of the starting fluid and is dispensed through the outlet fluid flow path to the diesel engine with which the device operates.

It will be readily appreciated that the device of this invention operates with a unitary one piece probe which sequentially closes the discharge flow path from the measuring chamber and then opens the inlet flow path to the measuring chamber during its actuating stroke. Conversely, during its deactuating stroke, the probe sequentially closes the inlet flow path and then opens the discharge flow path. The discharge flow path is disposed radially laterally of the probe bore and probe so that discharged fluid does not pass through or around the probe. A single core valve is used in the device and is adapted for reverse actuation by a lever operably connected to the probe. The result is a simplified inexpensive unit which can be operated by a low power solenoid, if desired.

Since many changes and variations of the disclosed embodiment of the invention may be made without departing from the inventive concept, it is not intended to limit the invention otherwise than as required by the appended claims.

What is claimed is:

1. An apparatus for providing a measured amount of fluid under pressure from a reservoir of a bulk supply of fluid of the type having an outlet valve normally closed against fluid flow, said apparatus comprising:
   a. means forming a measuring chamber for containing a predetermined volume of fluid under pressure;
   b. means forming a first fluid flow passage into said measuring chamber from the fluid reservoir outlet said first fluid flow passage being coaxial with the bulk supply outlet valve;
   c. a probe coaxial with the bulk supply outlet valve and mounted in said first fluid flow passage for axial movement therethrough between a first position free of engagement with the bulk supply outlet valve and a second position engaging the bulk supply outlet valve to open the latter, and return;
   d. means forming a second fluid flow passage out of said measuring chamber, said second fluid flow passage being radially offset from and having a portion with an axis which is substantially parallel to the axis of said probe;
   e. valve means contained in said second fluid flow passage;
   f. lever means mounted on said probe between end surfaces thereof and extending radially therefrom, said lever means engaging said valve means to hold the latter open while said probe is in said first position and said lever means being movable with respect to said valve means in response to axial movement of said probe toward said second position to close said valve means before said probe reaches said second position to enable filling of said measuring chamber with a measured amount of fluid under pressure while said probe is in said second position.

2. The apparatus of claim 1, further comprising means forming a fulcrum radially of the axis of said probe and about which said lever means is pivoted as said probe moves from said first position to said second position.

3. The apparatus of claim 2, further comprising first spring means operable to bias said lever means for pivotal movement about said fulcrum toward a valve means-closing position.

4. The apparatus of claim 3, further comprising second spring means operable to bias said lever means for pivotal movement about said fulcrum toward a valve means-opening position, said second spring means having a greater spring force than said first spring means, and said second spring means being rendered inoperative to bias said lever when said probe is moved axially to said second position.

5. The apparatus of claim 1 wherein said valve means is a reverse-actuated core valve.

6. The apparatus of claim 1, wherein said means forming said measuring chamber comprises: a body having a bore forming said first fluid flow passage and having an enlarged, threaded end portion; a cap threaded into said threaded end portion of said body and having a bore which is coaxial with said body bore; and a lock screw threaded into one of said body and cap and engaging a serrated washer overlapping each of said body and cap to secure said body and cap together firmly.

7. The apparatus of claim 6, wherein said cap includes an inner surface forming a fulcrum about which said lever means is pivoted to achieve opening and closing of said valve means.

8. The apparatus of claim 7, further comprising: a spring mounted about said probe; ring means secured to said probe and engaging said spring; said lever means including a portion encircling said probe and sandwiched between said ring means and said inner surface of said cap with said spring being operable to bias said lever means, by reason of said ring means, toward a valve means-opening position while concurrently biasing said probe toward said first position.

9. The apparatus of claim 8, wherein said second fluid flow passage extends through said cap and said valve means is a reverse-actuated core valve having an internal spring operable to bias said lever means toward a valve-closing position.

* * * * *